2,776,868

METHOD OF MAKING MULTIPLE COATED CALENDERED PATTERN FABRIC

William W. Russell, East Providence, and Herman C. Allen, Saylesville, R. I., assignors to Sayles Finishing Plants, Inc., Saylesville, R. I., a corporation of Rhode Island No Drawing. Application May 11, 1954,
Serial No. 429,124

7 Claims. (Cl. 8—114.5)

This invention relates to glazed pattern fabrics and to a method of finishing textile fabrics such as cellulosic fabrics to produce a fabric having a lustrous pattern finish, and pertains more specifically to the finishing of cotton fabrics to produce highly permanent lustrous glazed and embossed patterns thereon and to the fabrics so produced.

In the past fabrics having patterned glazed areas have been produced by printing a low polymer thermosetting resin in a pattern upon certain selected fabric areas, and then calendering at an elevated temperature to glaze and set the resin. Upon washing, the resin treated fabric areas remain glazed while adjacent fabric areas containing no resin lose their calendered glaze.

A serious disadvantage of the foregoing process and product resides in the weakening and tendering of the fabric which tends to occur, and which is especially troublesome on lighter weight fabrics, when the resin treated fabric areas which also must contain an acidic polymerization catalyst are subjected to simultaneous high temperature and heavy pressure in the glazing calender.

One object of the present invention is to provide a fabric having a calendered pattern which is permanent and resistant to washing and dry cleaning while at the same time preserving substantially the full strength of the underlying fabric.

Another object is to provide a fabric having upon its face a patterned protective coating of thermoset resin which serves to protect an underlying calendered finish.

Another object is to provide a method for coating selected areas of a fabric with a thermosetting resin and then causing the resin to set while substantially preventing any deleterious effect of the resin or the catalyst contained therein upon the underlying fabric.

Another object is to provide a fabric having a remarkably brilliant, lustrous, glazed or embossed pattern finish with sharply defined edges in marked contrast to adjacent non-lustrous, opaque and compacted or shrunken areas.

Other and further objects will be apparent from the description which follows:

One embodiment of the invention, which also is the preferred embodiment, comprises applying to selected localized areas of a fabric a mechanically deformable, water-repellent permanent resist initially free from strongly acidic ingredients, and remaining thus free even at elevated temperatures and pressures, followed by calendering the fabric with heat and pressure to provide the desired surface finish. There is then applied to the fabric from an aqueous solution or dispersion a neutral or alkaline buffering agent which is capable of preventing the polymerization of an acid catalyzed resin. Since this solution or dispersion does not wet the water-repellent permanent resist, the buffering agent is deposited only on those areas of the fabric not protected by the permanent resist. There is then applied to the fabric, from a solution or dispersion which will wet the permanent resist, a low-molecular weight, thermosetting resin, together with an acidic polymerization or condensation catalyst; and the fabric, after drying, is heated to cure or polymerize the resin to a thermoset condition in the areas protected by the permanent resist. Because of the presence of the buffer in the remaining areas of the fabric, little or no condensation or polymerization of the resin occurs in these areas. The calendered finish in these unprotected areas, together with any unpolymerized resin is then removed by washing, either with water or with an aqueous detergent solution. In a preferred embodiment of the invention, the fabric in the unprotected areas is also shrunken during this step by an alkaline chemical shrinking agent to provide compacted non-lustrous areas, the fabric in the protected areas bearing the calendered finish being displaced from the normal plane of the fabric by the shrinking of adjacent areas.

While a wide variety of fabrics may be employed in the present invention, it is particularly applicable to cellulose and cellulose derivative fabrics such as cotton, linen, regenerated cellulose rayons, particularly spun rayons, and mixtures of these various yarns and fibers with each other. It is less applicable to cellulose ester and ether rayons.

The term "calendering" as used in the specification and claims is used in its broad sense to include the operations carried out by rolling, chasing, frictioning, glazing, schreinering, embossing and beetling calenders and the like, and the term "calendered finish" includes finishes produced by such operations.

In carrying out the present invention, it is desirable, although not essential, that the fabric, prior to treatment with the permanent resist, be rendered absorbent by scouring, kiering, bleaching, mercerizing or the like. The fabric may be undyed, or may be dyed and/or printed in color. Following such treatment, and any washing step which may be employed, the fabric is dried to the desired dimensions, preferably with considerable tension on a tenter frame.

In one embodiment of the invention it is preferred to treat the fabric throughout its extent, following the scouring and prior to treatment with the permanent resist, by coating or impregnating it with a mechanically deformable cellulosic material which is preferably formed in situ, being deposited in and on the yarns of the fabric from a solution of cellulose in cuprammonium solution or in certain quaternary solvents, or preferably from a solution or dispersion of cellulose xanthine. Other cellulosic materials which are dispersible in and precipitatable as such from aqueous or aqueous alkaline media are also suitable for use in this step of the invention, such as cellulose ethers of a suitable degree of etherification, e. g. ethyl and propyl ethers of cellulose and hydroxy ethers such as the hydroxy ethyl ether of cellulose. The deposited cellulosic material, which remains permanently, or substantially permanently in and on the fabric, makes possible the calendering, especially of light weight fabrics, with little or no damage to the fabric yarns to provide a more durable finish.

The next step in the present invention comprises applying to selected localized fabric areas, preferably in accordance with a predetermined pattern such as in spaced square or diamond shaped areas, a permanent resist which is mechanically deformable (i. e. capable of being changed in shape and surface finish with a high degree of permanency by the application of pressure, usually at elevated temperatures) and which is free from strongly acidic ingredients even at the elevated temperatures and pressures to which the fabric is subsequently subjected during processing, and which is at least somewhat water-repellent. This resist composition may be applied to the fabric in any suitable manner, as by stenciling, spraying, printing, etc. The compositions employed in this step contain no acidic catalyst and may comprise already polymerized, thermoplastic resins, e. g. polyvinyl resins, acrylic resins, polystyrene resins, polyethylene resins, etc.; however the compositions preferably comprise cellulosic derivatives such as cellulose esters and ethers including mixed esters and ethers such as cellulose acetate, acetobutyrate, butyrate, propionate; methyl cellulose, ethyl cellulose, hydroxy ethylcellulose, carboxyl methyl cellulose, etc. Of these materials, cellulose acetate is most satisfactory. The foregoing cellulosic derivatives may be dissolved or dispersed in any of the well known aqueous and/or non-aqueous liquids in which they are soluble or dispersible. Unless the permanent resist after drying is itself sufficiently water repellent, a water repellency agent is also included in this resist composition and to this end any compatible agent may be employed such as the microcrystalline waxes, e. g. paraffin wax, cetylacetamide, stearic acid or other higher fatty acids and their water-repellent compounds stearamides, lauramides, etc. Also compatible metallic compounds and insoluble soaps such as aluminum, or zirconium stearates, oleates, palmitates, laurates, etc. may be employed. Certain silicones, and high molecular weight nitrogen compounds such as a stearamido methyl pyridinium salt, etc. may also be used if they yield no deleterious acid. This composition may also include any one or more of the usual thickeners, softeners, pigments, finely divided metals, fillers and dyestuffs. Any compatible softener may be used in the resist compositions and in the thermo setting resin compositions employed later in the process. As examples of some classes of suitable softeners the following may be mentioned: fatty carbamides and their salts, synthetic fatty esters, fatty amino condensation products, fatty acid glycerol derivatives, wax emulsions, etc.

The amount of the foregoing resist composition applied to the fabric in this step may be varied quite widely, as can be readily understood. When applied to the fabric by printing, the amount of cellulosic derivatives in the resist printing paste will usually lie within the range from 1% to 30% by weight, the exact amount depending among other things, upon the nature of the fabric, the design, the finish desired, etc. The design, in which the resist composition is placed upon the fabric by printing, stencilling, spraying or the like, may be widely varied. For example, this design which may cover various fractions of the surface area of the fabric e. g. from ten percent to ninety percent of the surface area of the fabric more or less, may take a great variety of forms of design. Thus the design may take the form of stripes, dots, squares, circles and other geometric forms, or scrolls, flowers, birds, insects, reptiles, ships, and many other forms. Following the application of the resist composition, the fabric is preferably heated to evaporate volatile solvents and to dry the composition.

Since the calendering operation is preferably carried out upon the fabric when it contains some 10% to 20% of moisture, the fabric if dried to a lower moisture content in the previous step is now preferably moistened prior to calendering. During the calendering operation which now follows, the moisture content of the fabric is considerably reduced since the calender rolls are preferably heated to a temperature between 250°–425° F., and a total nip pressure between 10 and 60 tons is desirably maintained. It should be noted that the fabric during the calendering operation contains substantially no ingredients which are reactive with the fabric material itself and therefore the fabric is not subject to the deleterious effects which would otherwise occur in the presence of such reactive agents as acidic catalysts at the high temperatures and pressures employed. To obtain the best smooth effects, several passages through the calender may be necessary.

In order to confine the polymerizing of the thermosetting resin primarily to the resist pattern areas of the fabric, the calendered fabric is treated with an agent which will retard or prevent resin polymerization. Such agents may act to nullify or diminish the action of an acidic polymerization catalyst which is present in the resin composition. In such a case the agents are preferably alkaline but may comprise either alkaline or even essentially neutral buffer materials. Among many such operable agents are phosphates such as disodium hydrogen phosphate, sodium tetraphosphate, also sodium acetate, sodium tetraborate, and many other acid-neutralizing substances, and buffers. The operable agent or agents should be applied dissolved or dispersed in a solvent or solution which does not wet or only slightly wets the permanent resist pattern areas of the fabric. Solutions in water alone are best, although small amounts of water-miscible lower aliphatic alcohols and ketones, not exceeding about 10% by weight of the total solvent, may also be present.

After the fabric is treated with the resin-polymerization-retarding agent, it is preferably at least partially dried, in which case the fabric may be again calendered, especially if it is desired to obtain the maximum brilliance and luster in the patterned fabric areas. Such calendering after the treatment with the resin-polymerization-retarding agent may replace the calendering step which normally follows the application of the permanent resist. In this case the treatment with the resin-polymerization-retarding agent follows directly after the application of the permanent resist and prior to calendering.

Following the application of the resin polymerization-retarding agent, and any subsequent calendering, the fabric is treated overall with a solution of thermosetting resin containing a polymerization catalyst. The resin at the time of application to the fabric preferably is only partly polymerized, being of low molecular weight. Thermosetting formaldehyde resins are preferred, such as those made by condensing formaldehyde with urea, thiourea, alkyl-substituted ureas, melamine, alkyl-substituted melamines, and the like, as well as mixtures of these with each other. Best results are obtained with low molecular weight melamine formaldehyde resins.

The resin is applied to the fabric in the form of a solution or dispersion in a solvent medium which is capable of wetting the areas covered by the water-repellent permanent resist, and which is incapable of dissolving to any substantial extent the previously applied resin-polymerization-retarding agent. Suitable resin solvents include a wide variety of organic materials such as liquid aliphatic and aromatic compounds and their mixtures. Aliphatic alcohols, ketones, and esters may be employed as well as such aromatic compounds as benzene and the xylenes, the aliphatic compounds preferably containing no more than eight carbon atoms. The methyl, ethyl, propyl and butyl alcohols are particularly desirable. In the case of solvents which are water-miscible, aqueous mixtures of the organic solvent containing less than 50% by weight of water, preferably less than 30% by weight, or whatever lesser amount is miscible with the organic solvent, may be employed. Standard resin catalysts which are soluble or at least dispersible in the resin solvents employed may be used, such as various acids and acidic substances, e. g. tartaric acid, benzoic acid, salicylic acid, various sulfonic acids, amine hydrochlorides, e. g. isopropylamine hydrochloride, also salts such as ammonium hydrogen phosphates, ammonium thiocyanate, etc. The concentration of the resin solution applied to the fabric in this step may be varied quite widely depending largely upon the nature of the fabric, the fabric pattern, and the nature of the finish desired, but will usually be between 5% and 40% by weight.

After the fabric has been treated with the resin solution, which may in addition to suitable catalysts also contain softeners, plasticizers, thickeners, dyestuffs, pigments, and the like if desired, the excess resin solution is removed as by squeezing, nipping, suction, centrifuging, or the like. The fabric pickup of resin solution may vary considerably, but a pickup of from 25% to 100% has proved satisfactory. The fabric is now preferably heat dried, and then cured at an elevated temperature for a suitable period of time. In general, the curing conditions employed are similar to those at present in use in the art when the same resins are employed in water solutions. Thus the resin-treated fabric may either during or after drying be cured, for example, at from 275° to 350° F. for from one-half to several minutes, depending largely upon the particular resin and catalyst employed. It should be noted that the underlying fabric is protected from the effect of the acid catalyst by the presence of the permanent resist in those areas where a resin is intended to be formed, and by the presence of the buffer in the remaining areas.

The next step is that of removing or reducing the calendered finish on the fabric areas which are not covered with the permanent resist and the thermoset resin. This step may be accomplished merely by treating the fabric with water, preferably at an elevated temperature. However, it is usually desirable to scour the fabric with aqueous detergents. Greater contrasting effects may be obtained by also employing strong aqueous alkaline solutions as, for example, aqueous caustic soda solutions of mercerizing strength. In general, best results are obtained using aqueous solutions of sodium hydroxide in the range of 20° Tw. to 90° Tw., although concentrations outside this range may be used, particularly when employed at temperatures below or above room temperature. Instead of sodium hydroxide there may be also employed other chemical shrinking agents such as potassium hydroxide, lithium hydroxide, quaternary ammonium hydroxides and the like. The fabric may be either wet or dry when treated with the strong aqueous alkaline solutions, but is preferably previously freed from the most of the resin-polymerization-retarding agent or buffer, as well as from low-molecular-weight resin ingredients. Washing with water or with an aqueous detergent solution generally suffices to remove these materials. The fabric may be maintained under tension or may be in a relaxed condition during the removal or reduction of the calendered finish in the non-pattern fabric areas.

The following examples further illustrate the scope of the invention but are not to be construed as placing any limitations thereon.

*Example 1*

A bleached cotton fabric counting 68 x 72, weighing 4.75 yards per pound, and having a greige width of 39 inches, was printed on a textile fabric printing machine using a pattern engraved roller which printed in a pattern a paste of the following resist composition:

| | Pounds |
|---|---|
| Cellulose acetate | 9.0 |
| Carbon black | 4.5 |
| Paraffin wax emulsion (20% wax) | 10.0 |
| Glycol monomethyl ether acetate | 72.0 |

After drying and framing to nearly greige width, the fabric was moistened with water in a sprinkler until it contained about 15 to 20 percent of moisture. The so-moistened fabric was immediately glazed by passing it three times through a friction calender heated to 375° F. and exerting a total nip pressure of 40 tons.

Following this operation the calendered fabric was impregnated with a 15 percent aqueous solution of disodium hydrogen phosphate buffer in a mangle and squeezed to a pickup of about 70 percent and then dried. Since this aqueous solution did not wet the resist-coated areas, the buffer was deposited for the most part only in the other areas of the fabric. The dry fabric was now once again passed through the friction calender under the same conditions of temperature and pressure as before.

Following this operation the calendered fabric was impregnated in a mangle with a bath of the following composition.

| | Pounds |
|---|---|
| Melamine formaldehyde low molecular weight polymer (80% aqueous solution) | 25.0 |
| Dicyandiamide | 10.0 |
| Fatty carbamide substantive cationic softener | 5.0 |
| Isopropylamine hydrochloride catalyst (30% aqueous solution buffered to pH 8) | 3.0 |
| Isopropyl alcohol | 60.0 |
| Water | 7.0 |

The pickup was about 50 percent, the solution wetting the resist-protected areas, as well as the rest of the fabric. The resin impregnated fabric was substantially dried by passing it through a tenter frame heated to about 260° F. Thereafter it was passed through a hot air curing chamber in which the fabric was maintained at 350° F. for two minutes to cure and set the resin in the areas protected by the resist but not appreciably in the remaining areas, which carried the polymerization-retarding buffer. The fabric was washed in hot, then cold, water and squeezed to a pickup of about 50 percent and then impregnated in a mangle with a 90° Tw. aqueous caustic soda solution. The pickup was about 100 percent. The impregnated fabric was allowed to stand in a slack, untensioned condition for about 15 minutes. Then the alkali treated fabric was thoroughly washed, first with hot and then with cold water, squeezed off and dried on a slack drier, then cold framed.

The finished fabric was characterized by a brilliant, jet black glazed pattern on the printed areas of the fabric, adjacent to non-lustrous compacted white fabric areas. The fabric had an embossed appearance due to the fact that the black glazed areas of the fabric were somewhat raised or depressed from the plane of the fabric as represented by the non-lustrous compacted and shrunken fabric areas.

*Example 2*

The fabric and the treatment were the same as in Example 1, except that the fabric counted 64 x 48 and weighed 4.0 yards per pound, and except that before the printing step in Example 1, the bleached fabric was impregnated in a mangle with an aqueous cellulose xanthate composition containing 3.0 percent cellulose (present as the cellulose in the xanthate) 2.5 percent sodium hydroxide and 2.0 percent of a substantive non-ionic softener. In addition, the bath contained products of the xanthation reaction. The pickup from the bath was about 50 percent. The impregnated fabric was run without drying into a bath of 10 percent sulfuric acid in which the xanthate was decomposed, leaving regenerated cellulose in and on the fabric. The acid-treated fabric was thoroughly washed, first with hot and then with cold water, squeezed off, and dried by passing through a heated tenter frame at near greige width. The fabric was then treated as in Example 1. The finished fabric was generally similar to that of Example 1, but was somewhat more full and bulky in hand.

*Example 3*

The fabric and treatment were the same as in Example 1, except that instead of using the printing paste of Example 1, the bleached fabric was printed with the following composition:

| | Pounds |
|---|---|
| Hydroxyethyl cellulose (5% solids in aqueous alkaline solution) | 50.0 |
| Paraffin wax emulsion (20% wax) | 10.0 |
| Blue pigment aqueous emulsion (25% solids) | 10.0 |

After the printing operation the treatment was the same as in Example 1. The fabric was of character similar to that of Example 1, except that the glazed pattern fabric areas were blue and not as lustrous.

Example 4

The fabric and treatment were the same as in Example 1, except that instead of using the printing paste of Example 1, the bleached fabric was printed with the following composition:

| | Pounds |
|---|---|
| Carboxyl methyl cellulose, sodium salt (5% solids in aqueous solution) | 50.0 |
| Paraffin wax emulsion (20% wax) | 10.0 |
| Blue pigment aqueous emulsion (25% solids) | 10.0 |

After the printing operation the treatment was the same as in Example 1. The fabric was similar to that produced in Example 3.

Example 5

The fabric and the treatment were the same as in Example 1, except that the fabric was not again passed through the friction calender after treatment with the disodium hydrogen phosphate solution. The fabric was similar to that produced in Example 1.

Example 6

The fabric and treatment were similar to Example 5, except that instead of passing the fabric through a friction calender, the calendering step comprised passing the moistened fabric, once through an embossing calender whose rolls were heated to about 350° F. The embossing calender had a deep intaglio pattern engraved steel roll geared to and strongly pressed against and into a fiber roll carrying the corresponding relief pattern, thereby constituting a pair of "female and male" embossing rolls. Following this operation the embossed fabric was dried to a low moisture content by passing around a series of steam heated drying cans carrying about 90 pounds of steam pressure. Otherwise the process was the same as Example 5. The finished fabric was characterized by jet black pattern areas which were substantially unshrunken, and which carried a sharply defined embossed pattern, adjacent to compacted, white fabric areas showing substantially none of said embossed pattern. The black, embossed fabric areas were somewhat raised or depressed from the plane of the fabric as represented by the compacted white fabric areas.

Example 7

The fabric and treatment were the same as in Example 6, except that the fabric was also passed through the friction calender prior to its passage through the embossing calender as in Example 6. The fabric was similar to that of Example 6, but black embossed fabric areas possessed more brilliance.

Example 8

The fabric and process were the same as in Example 1 except that the calendering of the fabric prior to the impregnation with the disodium hydrogen phosphate buffer was omitted, and the slightly moist fabric was passed through the friction calender three times after the impregnation with the disodium hydrogen phosphate buffer. Also to the disodium hydrogen phosphate buffer solution there was added 6% by weight of sulfonated castor oil as a lubricant.

The finished fabric had essentially the same characteristics as that in Example 1.

Although we have herein described specific embodiments of our invention, we do not intend to limit ourselves solely thereto, but to include all of the obvious variations and modifications within the spirit and scope of the appended claims.

We claim.

1. The method of making pattern-calendered cellulosic textile fabric which comprises applying to selected localized areas of said fabric a water-repellent mechanically deformable permanent textile resist coating for the subsequently applied chemical inhibitor of polymerization, said resist coating being free from strongly acidic ingredients which at elevated temperature and pressure tend to deteriorate said fabric, calendering said fabric to provide the desired surface finish, impregnating said fabric with an aqueous medium containing a chemical inhibitor of polymerization for the subsequently applied resin, impregnating said fabric with a low molecular weight thermosetting textile resin and catalyst from a liquid medium capable of wetting said permanent resist and in which said inhibitor is substantially insoluble, said resin being capable of coating said resist, heating said fabric to cure said resin in the areas protected by said resist, and washing said fabric with an aqueous medium to remove at least part of the calendered finish in the areas free from said resist.

2. The method of making pattern-calendered cellulosic textile fabric which comprises applying to selected localized areas of said fabric a water-repellent mechanically deformable permanent cellulosic textile resist coating for the subsequently applied substance which chemically inhibits polymerization, said resist coating being free from strongly acidic ingredients which at elevated temperature and pressure tend to deteriorate said fabric, calendering said fabric to provide the desired surface finish, impregnating the calendered fabric with an aqueous medium containing a substance which chemically inhibits polymerization of the subsequently applied acid-catalyzed resin, impregnating said fabric with a low molecular weight thermosetting textile resin and acid catalyst from a liquid medium capable of wetting said permanent resist and in which said substance is substantially insoluble, said resin being capable of coating said resist, heating said fabric to cure said resin in the areas protected by said resist, and washing said fabric with an aqueous medium to remove at least part of the calendered finish in the areas free from said resist.

3. The method of making pattern-calendered cotton textile fabric which comprises applying to selected localized areas of said fabric a water-repellent mechanically deformable permanent cellulosic textile resist coating for the subsequently applied substance which chemically inhibits polymerization, said resist coating being free from strongly acidic ingredients which at elevated temperature and pressure tend to deteriorate said fabric, calendering said fabric to provide the desired surface finish, impregnating the calendered fabric with an aqueous medium containing a substance which chemically inhibits polymerization of the subsequently applied acid-catalyzed resin, at least partially drying said fabric, impregnating said fabric with a low molecular weight thermosetting textile resin and acid catalyst from a liquid medium capable of wetting said permanent resist and in which said substance is substantially insoluble, said resin being capable of coating said resist, heating said fabric to cure said resin in the areas protected by said resist, and impregnating said fabric with an aqueous alkaline chemical shrinking agent for said cotton fabric to remove at least part of the calendered finish in the areas free from said resist and to shrink and compact said fabric in said areas.

4. The method of making pattern-calendered cotton textile fabric which comprises depositing on the yarns of said fabric from an aqueous medium a mechanically deformable cellulosic material selected from the class consisting of (1) regenerated cellulose and (2) cellulose ethers dispersible in aqueous alkaline media, applying to selected localized areas of said fabric a water-repellent mechanically deformable permanent cellulosic textile resist coating for the subsequently applied substance which chemicaly inhibits polymerization, said resist coating being free from strongly acidic ingredients which at elevated temperature and pressure tend to deteriorate said fabric, calendering said fabric to provide the desired surface finish, impregnating the calendered fabric with an aqueous medium containing a substance which chemically inhibits polymerization of the subsequently applied acid-catalyzed resin, impregnating said fabric with a low molecular weight thermosetting textile resin and acid catalyst from a liquid medium capable of wetting said permanent resist and in which said substance is substantially insoluble, said resin being capable of coating said resist, heating said fabric to cure said resin in the areas protected by said resist, and impregnating said fabric with an aqueous medium to remove at least part of the calendered finish in the areas free from said resist.

5. The method of making pattern-calendered cotton textile fabric which comprises applying to selected localized areas of said fabric a permanent textile resist coating for the subsequently applied substance which chemically inhibits polymerization, said resist including a cellulosic material and a water-repellent agent and being free from strongly acidic ingredients which at elevated temperature and pressure tend to deteriorate said fabric, calendering said fabric to provide the desired surface finish, impregnating the calendered fabric with an aqueous medium containing a substance which chemically inhibits polymerization of the subsequently applied acid-catalyzed resin, impregnating said fabric with a low molecular weight thermosetting textile resin and acid catalyst from a liquid medium capable of wetting said permanent resist and in which said substance is substantially insoluble, said resin being capable of coating said resist, heating said fabric to cure said resin in the areas protected by said resist, and impregnating said fabric with an aqueous alkaline chemical shrinking agent for said cotton fabric to remove at least part of the calendered finish in the areas free from said resist and to shrink and compact said fabric in said areas.

6. The method of making pattern-calendered cotton textile fabric which comprises applying to selected localized areas of said fabric a water-repellent mechanically deformable permanent textile resist coating for the subsequently applied chemical inhibitor of polymerization, said resist coating being free from strongly acidic ingredients which at elevated temperature and pressure tend to deteriorate said fabric, impregnating said fabric with an aqueous medium containing a chemical inhibitor of polymerization for the subsequently applied resin, calendering the impregnated fabric to provide the desired surface finish, impregnating the calendered fabric with a low molecular weight thermosetting textile resin and catalyst from a liquid medium capable of wetting said permanent resist and in which said inhibitor is substantially insoluble, said resin being capable of coating said resist, heating said fabric to cure said resin in the area protected by said resist, and washing said fabric with an aqueous medium to remove at least part of the calendered finish in the areas free from said resist.

7. The method of making pattern-calendered cellulosic textile fabric which comprises applying to selected, localized areas of said fabric a water repellent mechanically deformable permanent textile resist coating for the subsequently applied chemical inhibitor of polymerization, said resist coating being free from strongly acidic ingredients which at elevated temperature and pressure tend to deteriorate said fabric, impregnating said fabric with an aqueous medium containing a chemical inhibitor of polymerization for the subsequently applied resin, calendering said fabric at least once to provide the desired surface finish after applying said permanent resist, but prior to subsequent resin treatment, impregnating said fabric with a low molecular weight thermosetting textile resin and catalyst from a liquid medium capable of wetting said permanent resist and in which said inhibitor is substantially insoluble, said resin being capable of coating said resist, heating said fabric to cure said resin in the areas protected by said resist, and washing said fabric with an aqueous medium to remove at least part of the calendered finish in the areas free from said resist.

References Cited in the file of this patent

UNITED STATES PATENTS

| 780,636 | Cadgene | Jan. 24, 1905 |
| 2,531,814 | Heberlein | Nov. 28, 1950 |
| 2,681,867 | Miller | June 22, 1954 |

FOREIGN PATENTS

| 521,906 | Great Britain | June 4, 1940 |
| 592,649 | Great Britain | Sept. 24, 1947 |